3,496,007
METHOD FOR IMPROVING THE SURFACIAL PROPERTIES OF FIBROUS MATERIALS
Sho Miyamoto, 444 Hoonan-cho, Suginami-ku, and Koji Mizuta, 1, 2-chome Ginza, Chuo-ku, both of Tokyo, Japan
No Drawing. Filed July 8, 1965, Ser. No. 470,580
Claims priority, application Japan, July 10, 1964, 39/39,459; Jan. 19, 1965, 40/2,852; June 15, 1965, 40/35,600, 40/35,601
Int. Cl. D21h 1/22; B44d 1/44
U.S. Cl. 117—62.1                                          5 Claims

ABSTRACT OF THE DISCLOSURE

A method for improving the surfacial properties of a fibrous structure in which the fibrous structure is treated with the reaction product of a cellulosic compound with an amine, the cellulosic compound being carboxymethyl cellulose, carboxyethyl cellulose, hydroxyethyl cellulose, carboxymethylated starch or carboxyethylated starch, the amine being benzyl dimethyl (2-(2-(p-1,1,3,3-tetramethylbutyl-phenoxy)ethoxy-ethyl) - ammonium chloride, an alkyldimethyl ammonium chloride, Methylene blue or Methylene green. The reaction product may be administered in the form of a solution or a suspension, or it may be formed in situ on the fibrous structure by first treating the same with the cellulosic compound and thereafter with an aqueous solution of the amine.

---

This invention relates to the surfacial treatment of a fibrous structure material. This invention further relates to an agent useful for such surfacial treatment and a method for the preparation of same.

In the specification and claims, the term, "fibrous structure materials," is understood to include non-woven and woven fiber materials either natural or synthetic, and papers, and leathers.

In the prior art, a synthetic resin composition has been widely used to improve certain properties of fibrous materials. However, almost all the known resin compositions are usually water-repellent due to the hydrophobic nature of these resins and accordingly they undesirably render the treated materials poorly dyeable and moisture-absorption. This is particularly disadvantageous where the treated materials are textile fibers and papers which should have good dyeability and air- or moisture-permeability. In addition, the fibrous materials after being treated with the resin composition are sometimes excessively lustrous.

It is one object of the present invention to provide a new method for the surfacial treatment of fibrous structure materials to impart thereto improved physical properties without any adverse effect on dyeability or moisture-absorption.

Another object of the present invention is to provide a new agent useful for such surfacial treatment.

Other objects, features and advantages as comprehended by this invention will be apparent from the specification and claims which follow.

In accordance with the present invention, the above-mentioned objects are accomplished by the treatment of a fibrous structure material with the reaction product obtained from the reaction of a cellulosic compound and a high amine, both of which will be specified below.

We have found that the reaction product obtained by the reaction between a cellulosic compound and a high amine in a substantially equal weight ratio is useful as an agent for surfacial treatment of a fibrous structure material. The said product is prepared by adding an aqueous solution of a cellulosic compound to an aqueous solution of a high amine at a substantially equal weight ratio of reactants and stirring the resulting mixture until the desired product precipitates as a pale yellow or white powdery solid. This product is soluble in a 1:1 to 2:1 mixture of acetone and water or in tetrahydrofuran, it is swellable with alcohol, and insoluble in water.

Suitable for use as the cellulosic compounds, there are carboxymethyl cellulose, carboxyethyl cellulose, hydroxyethyl cellulose, carboxymethylated starch, carboxyethylated starch, etc.

Suitable high amines are the quaternary ammonium salts including benzethonium chloride which is benzyl dimethyl (2-(2-(p-1,1,3,3-tetramethylbutyl-phenoxy)ethoxy-ethyl)-ammonium chlorides; benzalkonium chloride which is an alkyldimethyl ammonium chloride; Methylene blue, Methylene green, etc.

The reaction product thus obtained can be used in the form of a suspension in water or in the form of a solution in a 2:1 to 1:1 acetone-water mixture or in tetrahydrofuran. If necessary, the suspension or solution may contain an additive such as alum, cellulose, calcium carbonate, talc, gypsum, clays, insoluble soap, polyvinyl alcohol, polyvinyl chloride, polyvinyl acetate, polymethacrylic esters, polyacrylic esters, cholesterin, etc. For example, a suspension or solution additionally containing polyvinyl alcohol, polyvinyl chloride, cholesterin, etc. can impart luster and softness to the treated fibrous structure materials. Addition of alum, clays, etc. to the solution or suspension will make the treated material milky white color in appearance. The suspension or solution can be applied to a fibrous structure material in any appropriate manner known in the dyeing art. For instance, the fibrous structure material may be sprayed, padded or impregnated with the said suspension or solution or it may be dipped into the said suspension or solution. The treated fibrous structure material is then washed with water and dried.

The fibrous structure material treated according to the present invention shows improvements in various properties as compared with the untreated material. Where the woven or non-woven cloth of synthetic textile fiber is treated, the metallic luster and transparency, both of which are inherent in synthetic textile fibers, can be reduced and a moderate amount of moisture-absorption can be obtained. In addition to this, the said cloth can be improved in dyeability, e.g. it will be ready for dyeing with commonly available dyes, such as naphthol dye, basic dye, direct dye, acidic dye or vegetable dye. The dyed cloth is very clear and it shows good fastness to laundering and light. Papers and leathers also can be improved in their dyeability and moisture-absorption. Generally speaking, when fibrous structure materials in the sheet form like non-woven fiber material, particularly paper are treated according to the invention, they show improved mechanical strength (tensile or tear strength) in comparison to the untreated ones.

In the present invention, as is apparent to those skilled in the art, the reaction product as an active ingredient may be formed in situ on a fibrous structure material. For this purpose, the fibrous structure material can be treated with an aqueous solution of the cellulosic compound and an aqueous solution of the high amine in any desired sequence. For example, a fibrous structure material is treated first with the cellulosic compound in the form of a suspension or solution. If drying is carried out at this stage, the coating of the cellulosic compound remains on the surface of the fibrous structure material. The said coating which is water-soluble is then converted into a water-insoluble film by the treatment of an aqueous high amine solution having the concentration of about 1-10%. The manner of treatment may be spraying or impregnation, the latter being somewhat preferable in view of the result obtained. The thus treated fibrous structure material is washed with water and then dried to give the desired product. During the final drying, embossing or calendering may be effected if desired.

The following examples describe certain ways in which the principle of the invention has been applied, but are not to be construed as limiting its scope.

EXAMPLE 1

To 500 ml. of an aqueous solution containing 1% carboxymethyl cellulose, 60 ml. of an aqueous solution containing 10% benzethonium chloride are added with vigorous agitation. The resulting mixture is allowed to stand for 20–30 minutes. The formed precipitate is collected by filtration and washed with water to remove unreacted benzethonium chloride. The precipitate is then dried to yield 11.5 g. of a white powdery mass. This is dissolved in 350 ml. of a 1:1 mixture of water and acetone. The resulting solution is usable as a stock solution, which can be diluted to three times its original volume and sprayed onto the fibrous structure material to be treated.

EXAMPLE 2

To 1 g. of carboxymethl cellulose dissolved in 100 ml. of water, 2 g. of cellulose-alum (which is a dry powder obtained by adding 10% alum to 200-mesh cellulose powder and then drying) is added. The resulting mixture is ground in a ball mill to have a suspension. Then, combing ribbon wrap is impregnated well with the suspension, washed with water, and then squeezed and dried to form a paper-like cloth. Then this paper cloth is dipped into an aqueous solution containing 2% benzethonium chloride for 5 minutes, after which the said cloth is removed, washed with water, and then squeezed and dried at an ordinary temperature, thereby to obtain a non-woven fabric.

EXAMPLE 3

The same procedures as in Example 2 are repeated except that a woven fabric is used instead of the combing ribbon wrap used in Example 2.

To 2.5 g. of naphthol AS dissolved in 5 ml. of denatured alcohol, 3.75 ml. of sodium hydroxide (38° Baumé) and then 5 ml. of warm water are added. To the resulting solution are added 5 ml. of a solution containing 1% Teepol (trademark for a surfactant manufactured and sold by Shell Co., Ltd. The principal component of Teepol is a mixture of the sodium salts of sulfated fatty alcohols; Merck Index, 8th ed. page 482). The solution is made up to 1 ml. Into this solution, the above-treated woven fabric is dipped for 10–20 minutes. Then the fabric is moved and dipped into a solution containing 11.6 g. of Red Salt 3GL which is a dye listed in the Color Index under C.I. 37040 (4-chloro-2-nitroniline-zinc chloride complex) in 2 l. of water for 5–10 minutes, thereby to develop color. After washing with water and drying, the fabric dyed in brilliant red color is obtained. No fading or discoloring is observed after severe laundering or exposure to sunlight for a long period of time.

What we claim is:

1. A method for improving the surfacial properties of a fibrous structure material, said method comprising treating a fibrous structure material selected from the group consisting of textile fibers, papers and leathers with a reaction product obtained by the reaction of substantially equal amounts by weight of a cellulosic compound and a high amine, said cellulosic compound being selected from the group consisting of carboxymethyl cellulose, carboxyethyl cellulose, hydroxyethyl cellulose, carboxymethylated starch and carboxyethylated starch, and said high amine being selected from the group consisting of benzyl dimethyl (2-(2-(p-1,1,3,3-tetramethylbutyl - phenoxy)ethoxy - ethyl) - ammonium chloride, an alkyldimethyl ammonium chloride, Methylene blue and Methylene green, and drying the thusly treated fibrous structure material.

2. A method as claimed in claim 1, wherein the reaction product is formed in situ on the fibrous structure material by treating the fibrous structure material first with a solution or suspension of the cellulosic compound, treating said material with a 1–10% aqueous solution of the high amine and drying same.

3. A method as claimed in claim 1, wherein said reaction product is used in the form of a solution thereof in a 1:1 to 2:1 mixture of acetone and water.

4. A method as claimed in claim 1, wherein said reaction product is used in the form of a suspension thereof in alcohol or water.

5. A method as claimed in claim 1 wherein the reaction product is in the form of a solution or suspension and said solution or suspension further contains at least one member of the group consisting of alum, cellulose, calcium carbonate, talc, gypsum, clays, insoluble soap, polyvinyl alcohol, polyvinyl chloride, polyvinyl acetate, polymethacrylic esters, polyacrylic esters and cholesterin.

References Cited

UNITED STATES PATENTS

| 2,314,277 | 3/1943 | Hurd | 8—180 X |
| 2,422,572 | 6/1947 | Lilienfeld | 117—157 X |
| 2,502,782 | 4/1950 | Erickson | 117—157 X |
| 2,502,783 | 4/1950 | Erickson | 117—157 X |
| 2,776,911 | 1/1957 | Gregory | 117—157 X |
| 2,776,912 | 1/1957 | Gregory | 117—157 X |
| 3,052,561 | 9/1962 | Kronfeld | 117—156 X |
| 3,338,658 | 8/1967 | Capponi et al. | 8—54.2 X |

WILLIAM D. MARTIN, Primary Examiner

M. R. LUSIGNAN, Assistant Examiner

U.S. Cl. X.R.

8—30, 31, 46, 100; 117—139.5, 142, 154, 156, 157